United States Patent
Isoda

(10) Patent No.: US 9,140,783 B2
(45) Date of Patent: Sep. 22, 2015

(54) RADAR DEVICE

(75) Inventor: Kentaro Isoda, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 343 days.

(21) Appl. No.: 13/704,756

(22) PCT Filed: Jun. 17, 2010

(86) PCT No.: PCT/JP2010/060278
§ 371 (c)(1),
(2), (4) Date: Dec. 17, 2012

(87) PCT Pub. No.: WO2011/158359
PCT Pub. Date: Dec. 22, 2011

(65) Prior Publication Data
US 2013/0088380 A1    Apr. 11, 2013

(51) Int. Cl.
G01S 7/28 (2006.01)
G01S 7/285 (2006.01)
G01S 13/02 (2006.01)
G01S 13/10 (2006.01)
(Continued)

(52) U.S. Cl.
CPC . *G01S 13/58* (2013.01); *G01S 7/28* (2013.01); *G01S 7/285* (2013.01); *G01S 7/352* (2013.01); *G01S 13/24* (2013.01); *G01S 13/34* (2013.01); *G01S 13/0209* (2013.01); *G01S 13/10* (2013.01); *G01S 13/582* (2013.01); *G01S 2007/356* (2013.01)

(58) Field of Classification Search
CPC ........... G01S 13/58; G01S 7/28; G01S 7/352; G01S 13/02; G01S 13/04; G01S 13/08; G01S 13/18; G01S 13/24; G01S 13/34; G01S 7/285; G01S 2007/356; G01S 13/0209; G01S 13/10; G01S 13/582
USPC ............. 342/70–72, 109–112, 104, 118, 134; 340/435, 436, 903; 701/301
See application file for complete search history.

(56) References Cited

U.S. PATENT DOCUMENTS 4,646,097 A * 2/1987 King ................................ 342/95
6,111,537 A * 8/2000 Andersson ..................... 342/137
(Continued)

FOREIGN PATENT DOCUMENTS

EP    2 026 098 A1    2/2009
JP    62 237375    10/1987
(Continued)

OTHER PUBLICATIONS

Office Action issued Sep. 24, 2013 in Japanese Patent Application No. 2012-520217 with English language translation.
(Continued)

*Primary Examiner* — Peter Bythrow
(74) *Attorney, Agent, or Firm* — Oblon, McClelland, Maier & Neustadt, L.L.P.

(57) ABSTRACT

In a radar device, a wide band filter unit suppresses unnecessary components contained in a reception signal subjected to frequency conversion by a frequency conversion unit. The wide band filter unit has frequency characteristics for performing filtering so that isolation between transmitting and receiving becomes a desired level or lower. Although the wide band filter unit has an increased noise power compared to a matched filter, the wide band filter performs the filtering so as not to round a pulse waveform.

8 Claims, 14 Drawing Sheets

(51) Int. Cl.
*G01S 13/34* (2006.01)
*G01S 13/58* (2006.01)
*G01S 7/35* (2006.01)
*G01S 13/24* (2006.01)

(56) References Cited

U.S. PATENT DOCUMENTS

| | | | |
|---|---|---|---|
| 6,727,840 B1* | 4/2004 | Sullivan | 342/13 |
| 8,823,579 B2* | 9/2014 | Edwards | 342/104 |
| 2006/0158370 A1* | 7/2006 | Kurashima et al. | 342/118 |
| 2007/0247351 A1* | 10/2007 | Falk | 342/109 |
| 2009/0295623 A1* | 12/2009 | Falk | 342/109 |
| 2012/0001790 A1* | 1/2012 | Edwards | 342/93 |

FOREIGN PATENT DOCUMENTS

| | | |
|---|---|---|
| JP | 6 82550 | 3/1994 |
| JP | 2007-316066 A | 12/2007 |
| JP | 2008 151698 | 7/2008 |
| JP | 2009 198319 | 9/2009 |
| JP | 2009198319 A * | 9/2009 |
| WO | 2006 085352 | 8/2006 |

OTHER PUBLICATIONS

International Search Report Issued Jul. 13, 2010 in PCT/JP10/60278 Filed Jun. 17, 2010.
The Extended European Search Report issued Oct. 27, 2014, in Application No. / Patent No. 10853240.9-1812 / 2584373.

* cited by examiner

RADAR DEVICE

TECHNICAL FIELD

The present invention relates to a radar device used for a collision-avoidance radar or the like, for avoiding collision between a vehicle and another vehicle running ahead of the vehicle.

BACKGROUND ART

In general, an on-vehicle radar for collision avoidance is required to have not only improved ability of detecting a long distance target but also ability of detecting a short distance target. In order to detect a long distance target, it is necessary to improve a signal-to-noise ratio (SNR). Therefore, as a filter of a receiver for maximizing the SNR, a matched filter is often used.

In addition, in a conventional device as described in Patent Literature 1, for example, analog receiver filters for short distance and long distance are used. In this way, detection accuracy of a short distance target is improved, and deterioration of distance resolution for a long distance target is allowed so that detection sensitivity is improved.

CITATION LIST

Patent Literature

[PTL 1] JP 62-237375 A

SUMMARY OF INVENTION

Technical Problem

In this case, in the on-vehicle radar for collision avoidance, a multistatic system is usually adopted for transmission and reception separately in order to detect a short distance target. When the matched filter is used as described above, the SNR of echo from a short distance target is sufficient. However, as illustrated in FIG. 3(b), the SNR becomes largest, but the pulse waveform is rounded. As a result, because of leakage of a transmission signal such as a direct wave, isolation between transmitting and receiving may be deteriorated. When the isolation between transmitting and receiving is bad in this way, it is difficult to detect echo from a short distance target based on the transmission signal.

In addition, because the conventional device as described in Patent Literature 1 is an optical radar device, the isolation between transmitting and receiving does not cause a particular problem, and Patent Literature 1 does not describe any structure for improving the isolation between transmitting and receiving. In other words, in a radar device using a radio wave of a millimeter wave band or the like, improvement of the isolation between transmitting and receiving becomes a task.

The present invention is made to solve the above-mentioned problem, and an object thereof is to provide a radar device that can improve the isolation between transmitting and receiving in a case of using a radio wave of a millimeter wave band or the like.

Solution to Problem

A radar device according to the present invention includes: a transmission control unit that generates a reference signal corresponding to a predetermined radar method; a pulse signal generation unit that modulates the reference signal input from the transmission control unit into a pulse signal; a transmission antenna that radiates the pulse signal from the pulse signal generation unit into air; a reception antenna that receives a reflected signal from a target; a frequency conversion unit that uses the reference signal from the transmission control unit so as to convert a frequency of a reception signal received by the reception antenna; a wide band filter unit that has frequency characteristics for performing filtering so that isolation between transmitting and receiving becomes a desired level or lower, and suppresses unnecessary components in a signal from the frequency conversion unit so as to extract a desired signal; an A/D conversion unit that converts an output signal from the wide band filter unit into a digital signal; a storage unit that stores the digital signal from the A/D conversion unit; a frequency analyzing unit that performs frequency analysis on the digital signal stored in the storage unit; a target detection unit that detects, from the signal processed by the frequency analyzing unit, the reflected signal from the target as a target signal; and a target distance and relative speed calculation unit that calculates, from the target signal detected by the target detection unit, a distance and a relative speed of the target.

DESCRIPTION OF EMBODIMENTS

Hereinafter, embodiments of the present invention are described with reference to the drawings.

Embodiment 1

Figure 1:
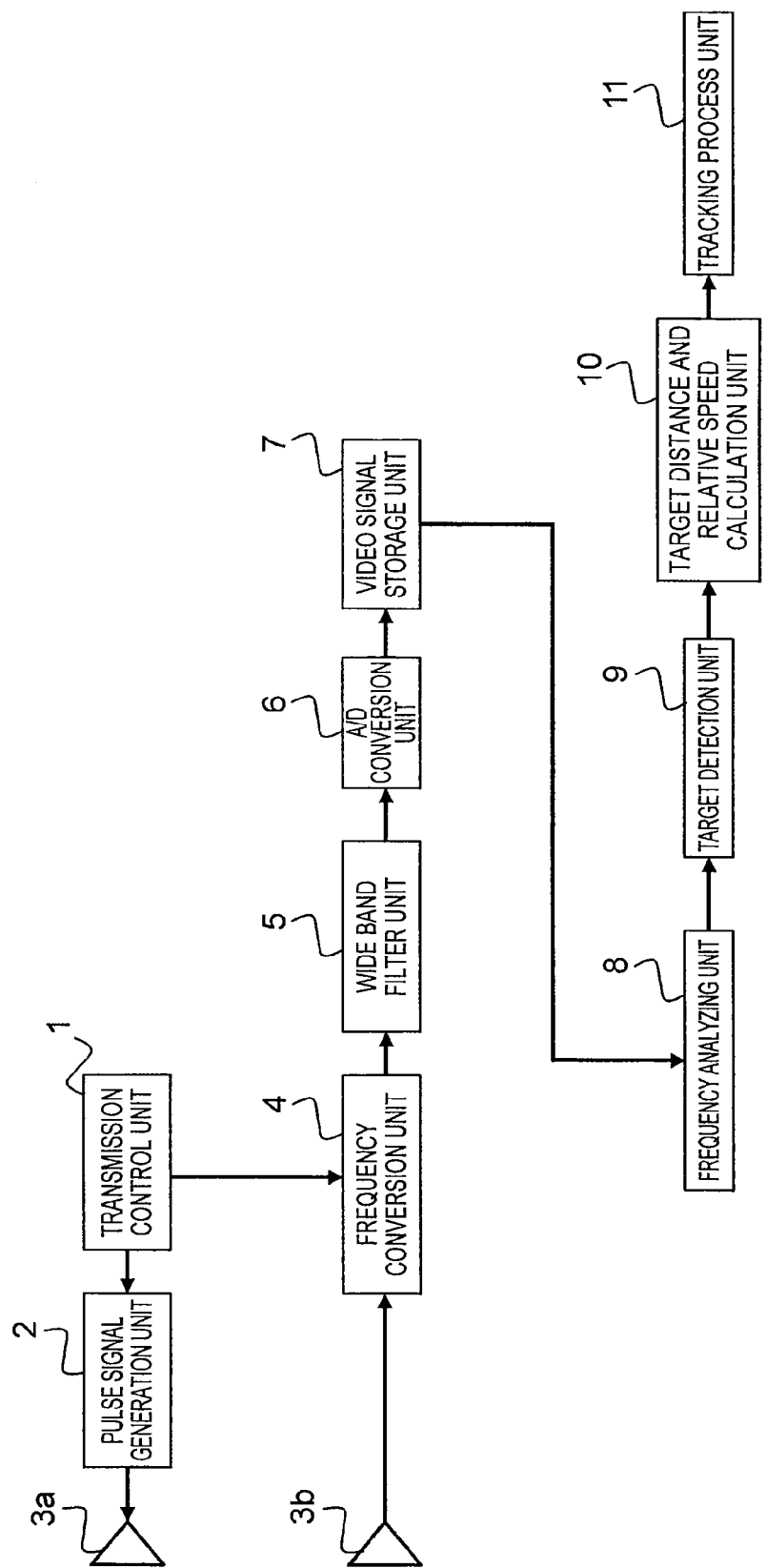
[FIG. 1] A block diagram illustrating a radar device according to Embodiment 1 of the present invention.

FIG. 1 is a block diagram illustrating a radar device (pulse radar device) according to Embodiment 1 of the present invention.

In FIG. 1, the radar device of Embodiment 1 includes a transmission control unit (transmitter control device) 1, a pulse signal generation unit (transmitter) 2, a transmission antenna 3a, a reception antenna 3b, a frequency conversion unit (frequency converter) 4, a wide band filter unit (wide band filter device) 5, an A/D conversion unit (A/D converter) 6, a video signal storage unit (video signal memory) 7, a frequency analyzing unit (frequency analyzing device) 8, a target detection unit (target detection device) 9, and a target distance and relative speed calculation unit (target distance and relative speed calculation device) 10.

The transmission control unit 1 generates a reference signal corresponding to a method for target distance calculation and relative speed calculation processed by the target distance and relative speed calculation unit 10. In addition, the reference signal generated by the transmission control unit 1 is sent to the pulse signal generation unit 2 and the frequency conversion unit 4.

Figure 2:
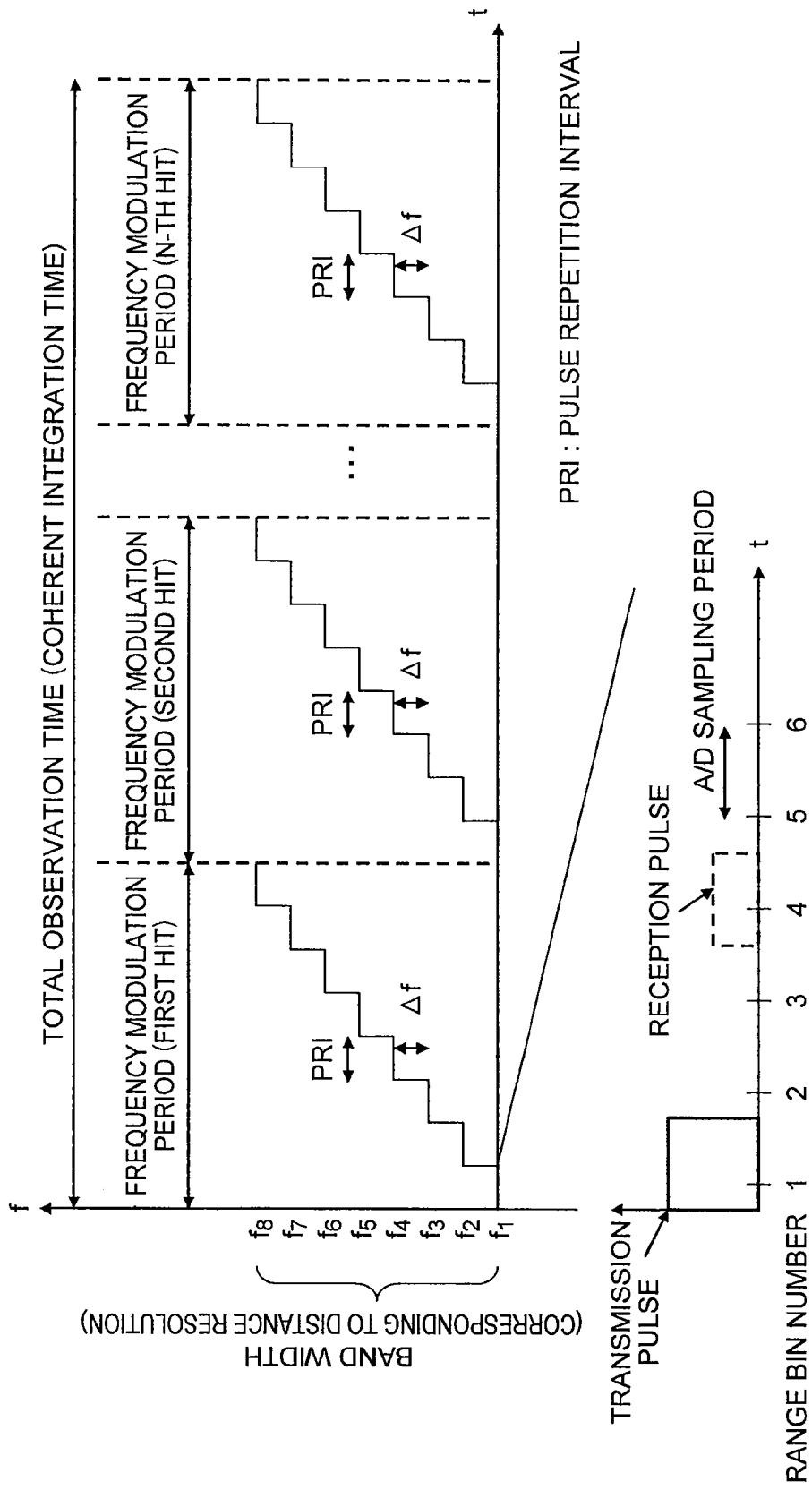
[FIG. 2] An explanatory diagram illustrating an action of the radar device of FIG. 1.

In the following, there is described an example of a case where a multi-frequency step interrupted continuous wave (ICW) method illustrated in FIG. 2 is adopted as the method of target distance calculation and relative speed calculation (predetermined radar method). Note that, as a principle of the multi-frequency step ICW method, for example, a method described in International Patent WO 2006/085352 (target detecting device) can be used.

When the multi-frequency step ICW method is used as the method for target distance calculation and relative speed calculation, the transmission control unit 1 changes the transmission frequency by a step frequency $\Delta f$ in every pulse repetition interval (PRI) as illustrated in FIG. 2, so as to send the reference signal to the pulse signal generation unit 2 and the frequency conversion unit 4. Note that, as the method for target distance calculation and relative speed calculation, besides the multi-frequency step ICW method, there are a pulse Doppler method, a frequency modulation (FM) pulse method, a combined band process method, and the like. When one of those methods is adopted, the transmission control unit 1 generates the reference signal corresponding to each method and sends the generated reference signal to the pulse signal generation unit 2 and the frequency conversion unit 4.

The pulse signal generation unit 2 generates a pulse signal having a frequency of the reference signal from the transmission control unit 1 as a carrier frequency and sends the generated signal to the transmission antenna 3a. The transmission antenna 3a radiates the pulse signal from the pulse signal generation unit 2 into the air. The pulse signal radiated from the transmission antenna 3a is reflected by a target and is received by the reception antenna 3b. In addition, a direct wave from the transmission antenna 3a is also received by the reception antenna 3b.

The frequency conversion unit 4 performs frequency conversion of the reception signal received by the reception antenna 3b using a reference signal from the transmission control unit 1. The reception signal subjected to frequency conversion is sent to the wide band filter unit 5.

Figure 3:
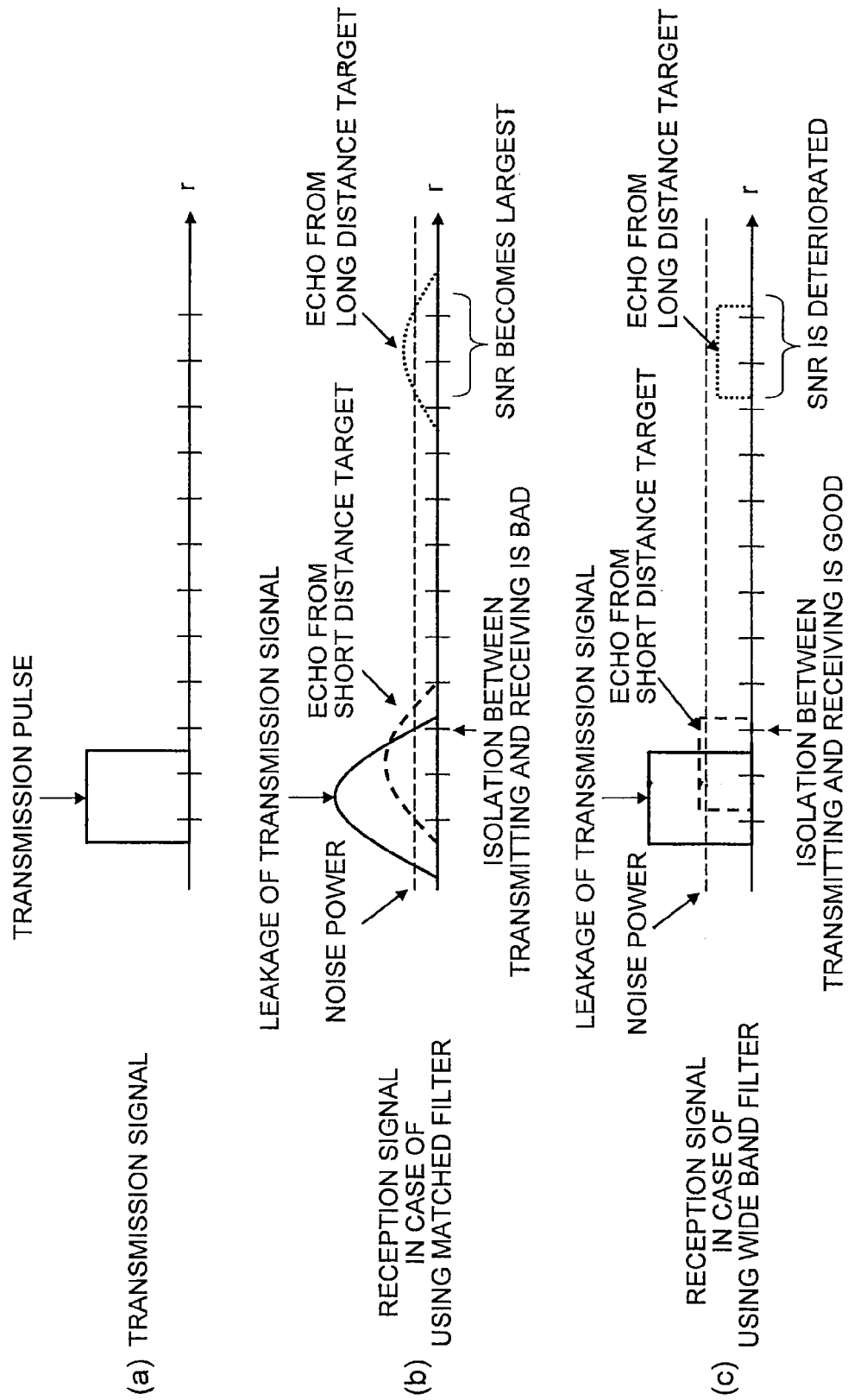
[FIGS. 3] Explanatory diagrams illustrating a matched filter output and a wide band filter output.

The wide band filter unit 5 suppresses the unnecessary components (unnecessary signals) contained in the reception signal subjected to frequency conversion by the frequency conversion unit 4. In addition, the wide band filter unit 5 has frequency characteristics for performing the filtering so that isolation between transmitting and receiving becomes a desired level or lower. This wide band filter unit 5 performs the filtering so as not to round the pulse waveform though noise power increases compared with the matched filter. As a result, as illustrated in FIG. 3(c), the SNR is deteriorated compared with the matched filter, but the isolation between transmitting and receiving can be improved.

Here, a filter band width and a filter response of the wide band filter unit 5 are described. In this case, it is supposed that a pulse width of the pulse signal is $T_P$, and a time width of an impulse response of the filter is $T_F$. In addition, a pulse signal is supposed to be s(t). Then, the matched filter is expressed by s*(−t). Therefore, the time width $T_F$ of the matched filter matches with the pulse width $T_P$. In this case, "*" indicates complex conjugate.

Figure 4:
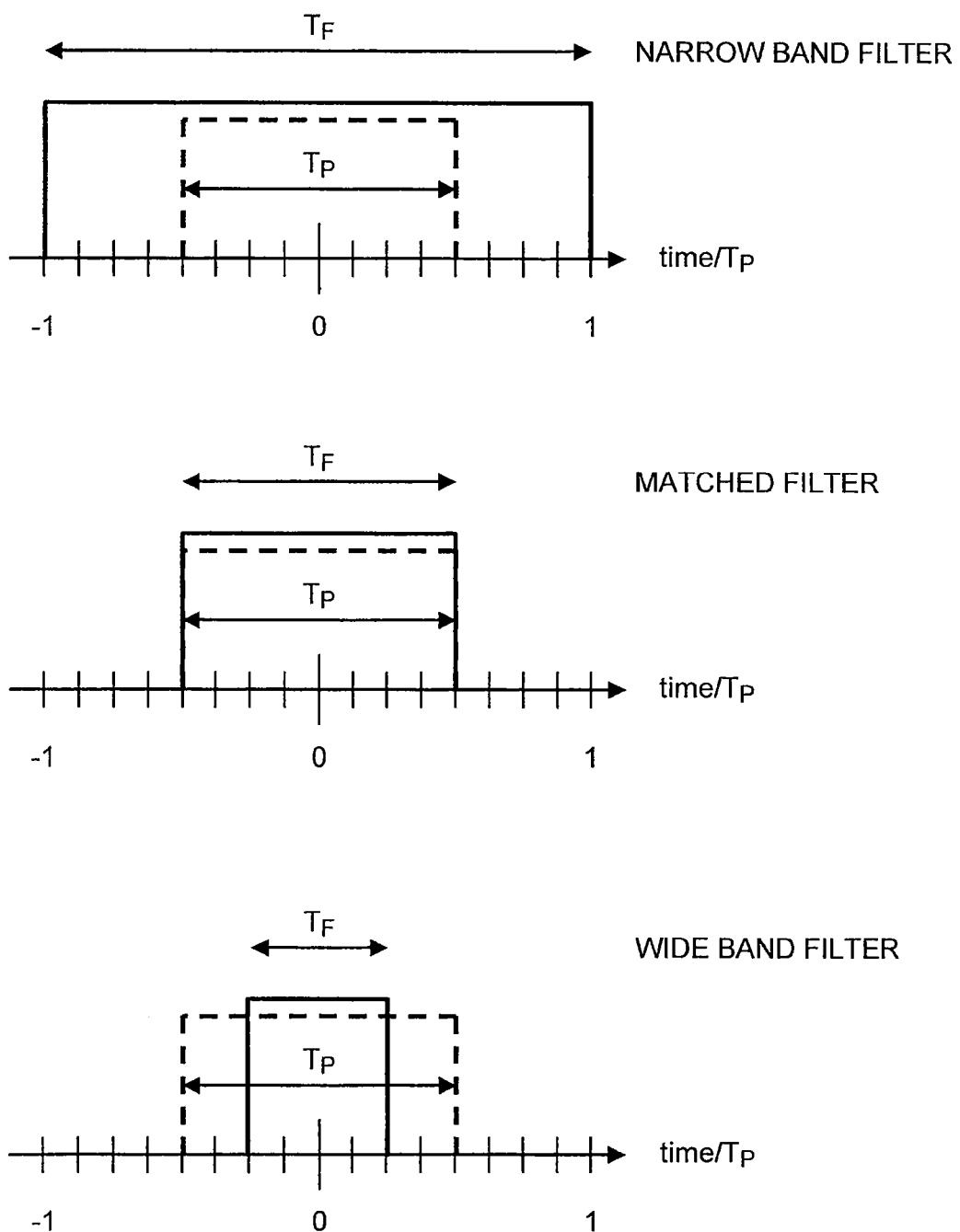
[FIG. 4] An explanatory diagram illustrating an impulse response relationship among a narrow band filter, a matched filter, and a wide band filter for a pulse signal having a pulse width $T_P$.

Because a band width of the filter is a reciprocal ($1/T_F$) of the time width $T_F$, a time width of a narrower band filter than the matched filter is longer than $T_P$, and a time width of a wider band filter than the matched filter is shorter than $T_P$. A relationship among impulse responses of the narrow band filter, the matched filter, and the wide band filter for a signal having the pulse width $T_P$ is illustrated in FIG. 4. The horizontal axis of FIG. 4 represents time normalized by the pulse width $T_P$.

Figure 5:
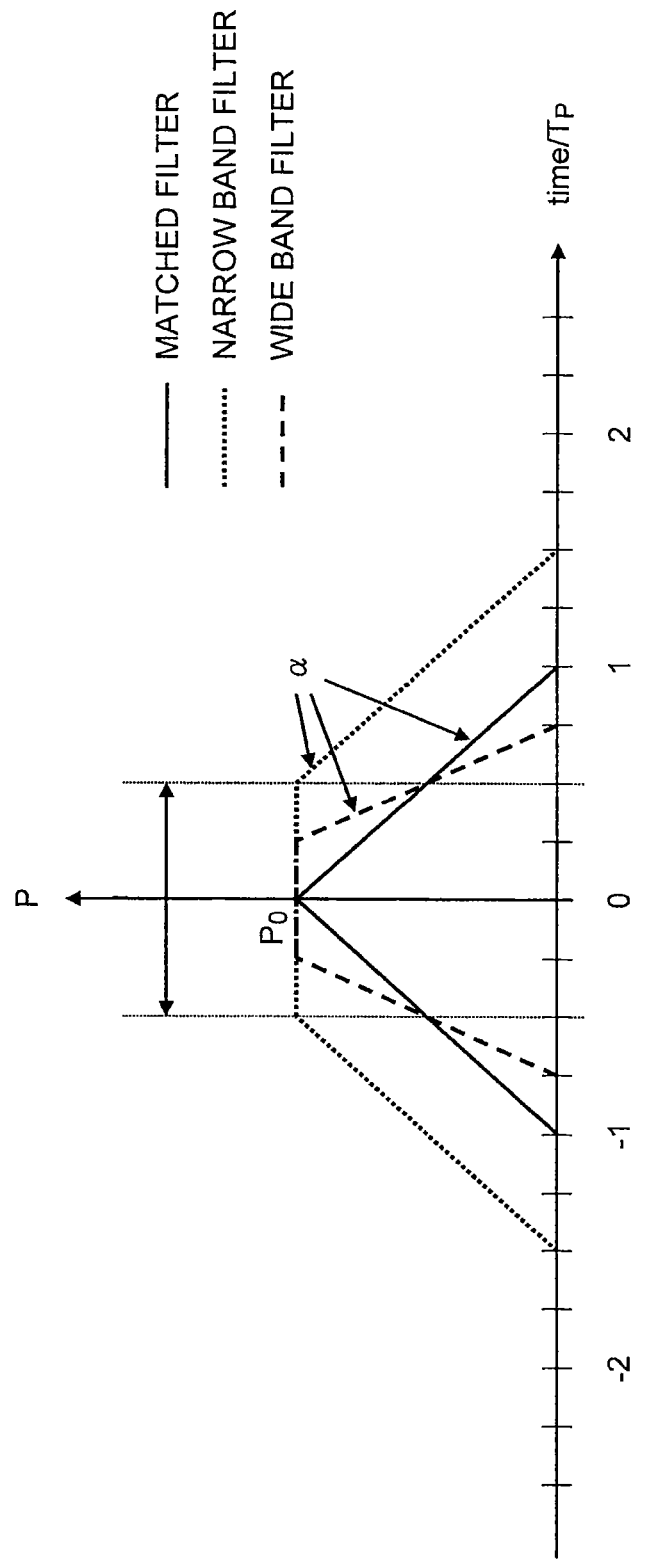
[FIG. 5] An explanatory diagram illustrating filter responses of the narrow band filter, the matched filter, and the wide band filter for a pulse signal having a pulse width $T_P$.

A filter process is equivalent to a convolution process on the time axis. The responses of the narrow band filter, the matched filter, and the wide band filter for the pulse signal having the pulse width $T_P$ are illustrated in FIG. 5. The horizontal axis of FIG. 5 represents time normalized by the pulse width $T_P$, and the time at which the filter response becomes largest is time point 0. In addition, the vertical axis of FIG. 5 represents a power of the filter response, and a largest value of the filter response is $P_0$. As illustrated in FIG. 5, a response of the matched filter is a triangular response, while responses of the narrow band filter and the wide band filter are trapezoidal responses.

Absolute values of inclinations of the triangle and the trapezoid, which are indicated by a in FIG. 5, are the same between cases using the matched filter and using the narrow band filter. On the contrary, when the wide band filter is used, the absolute value becomes larger than the case using the matched filter, and the isolation between transmitting and receiving of a short distance range gate can be improved. In addition, when the wide band filter is used, the inclination of the trapezoidal filter response indicated by $\alpha$ in FIG. 5 is expressed by $-P_0/T_F$. Further, a straight line of $\alpha$ is a straight line passing through ($T_P/2$, $P_0/2$). Therefore, the straight line of a is expressed by the following expression (1). Here, $P_0=1$ holds from the following expression (1).

$$P(t) = -(1/T_F) \times (t - T_P/2) + \tfrac{1}{2} \qquad (1)$$

In addition, in order that instantaneous power at time point $t=\tau$ becomes X (dB) or smaller with respect to a peak power of the filter response, it is necessary to satisfy the following expression (2).

$$10\log(-(1/T_F) \times (t - T_P/2) + \tfrac{1}{2}) \leq X$$

$$\Leftrightarrow T_F \leq (T_P/2 - \tau) \times (10^{X/10} - \tfrac{1}{2})^{-1}$$

$$\cong (10^{X/10} - \tfrac{1}{2}) < 0 \qquad (2)$$

Provided that $0 < T_F \leq T_P$, $T_P/2 \leq \tau < (T_F + T_P)/2$, and $X \leq 0$ are satisfied.

For instance, in order that the instantaneous power at time point $\tau=0.6\,\mu s$ for a pulse signal having a pulse width $T_P=1\,\mu s$ becomes $X=-10$ dB of the peak power of the filter response, the value is substituted into the above expression (2), and $T_F < 0.25\,\mu s$ is satisfied. Because a reciprocal of $T_F=0.25\,\mu s$ is 4 MHz, the filter band of the wide band filter is only required be set four times or more larger than the signal band compared with the pulse signal band $1/T_P=1$ MHz as shown in FIG. 6(a).

Figures 6A, 6B:
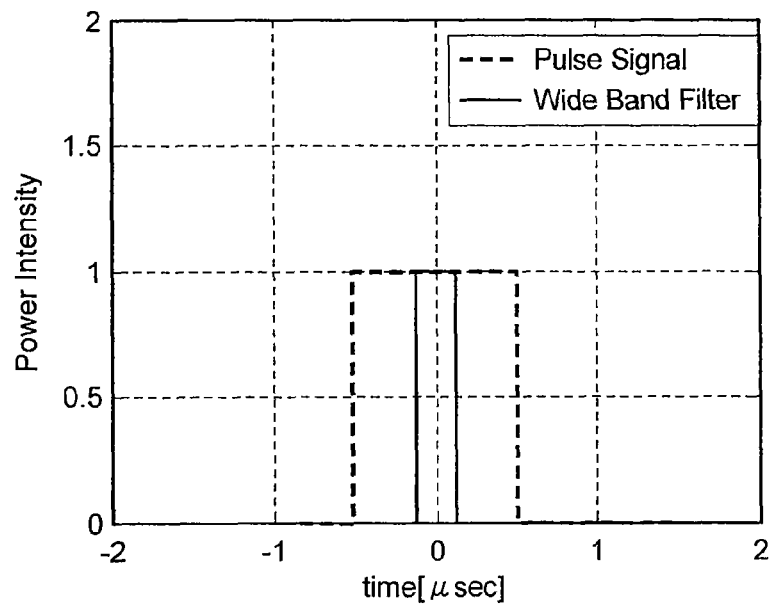
[FIGS. 6] Explanatory graphs showing a filter band and a filter response of the wide band filter.

Results of a numerical calculation using the above-mentioned parameters are shown in FIG. 6(b). Referring to FIG. 6(b), it is confirmed that the filter response at time point τ=0.6 μs is −10 dB of a peak instantaneous power. In addition, it is confirmed that the filter response at time point τ=0.6 μs is approximately −6 dB of a case using the matched filter, and hence it is confirmed that the isolation is improved.

Next, the reception signal that has passed through the wide band filter unit 5 is sent to the A/D conversion unit 6. This reception signal is converted from an analog signal into a digital reception signal by the A/D conversion unit 6. This digital reception signal is sent to the video signal storage unit 7 and is stored in the video signal storage unit 7. In this case, a sampling frequency of the A/D conversion unit 6 is set in advance based on a sampling theorem so that the reflected signal from the target does not cause aliasing.

The frequency analyzing unit 8 performs frequency analysis of the digital reception signal stored in the video signal storage unit 7. As a method of the frequency analysis, there is a fast Fourier transform (FFT), for example. When the multi-frequency step ICW method is adopted as the method for target distance calculation and relative speed calculation, the frequency analyzing unit 8 performs the FFT of the digital reception signals having the same transmission frequency for each range bin in an HIT direction. Then, the frequency analyzing unit 8 sends the signal subjected to the FFT to the target detection unit 9.

The target detection unit 9 detects a target signal from an input signal from the frequency analyzing unit 8. As a method for the target detection, there is a constant false alarm rate (CFAR), for example. The target detection unit 9 sends frequency information of the detected target to the target distance and relative speed calculation unit 10.

The target distance and relative speed calculation unit 10 calculates a distance and a relative speed of the target detected by the target detection unit 9. When the multi-frequency step ICW method is adopted as the method for target distance calculation and relative speed calculation, the relative speed is calculated from the frequency information of the target detected by the target detection unit 9.

In addition, the target distance and relative speed calculation unit 10 calculates the target distance from a phase gradient between different carrier frequencies (for example, f1 to f8 in FIG. 2). The information of the distance and the relative speed of the target calculated by the target distance and relative speed calculation unit 10 is sent to a tracking process unit 11. The tracking process unit 11 tracks the target by a track filter using a Kalman filter, for example.

According to the radar device of Embodiment 1 described above, the wide band filter unit 5 has frequency characteristics for performing the filtering so that the isolation between transmitting and receiving becomes a desired level or lower. With this structure, the isolation between transmitting and receiving in the case using a radio wave is improved, and hence a signal from the short distance target can be easily detected.

In addition, because distance resolution is determined by a transmission band width, the distance resolution is not deteriorated also in a long distance. Therefore, in the radar device of Embodiment 1, it is possible to improve the isolation between transmitting and receiving and to suppress deterioration of distance resolution within an observation distance range.

Embodiment 2

Embodiment 1 describes the structure in which the isolation between transmitting and receiving is improved by using the wide band filter unit 5. In contrast, Embodiment 2 describes a structure in which the isolation between transmitting and receiving is improved by using a digital filter unit 12.

Figure 7:
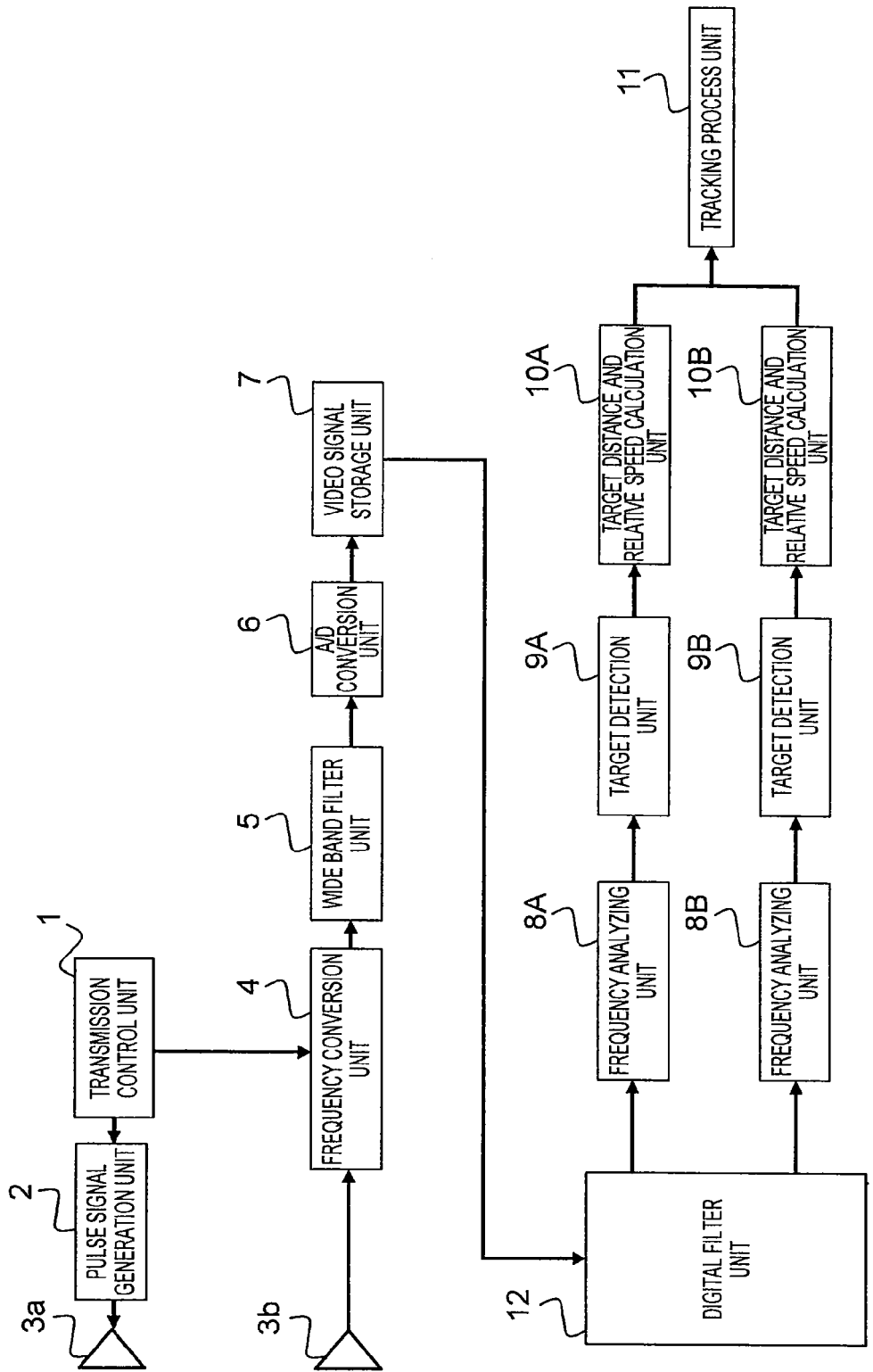
[FIG. 7] A block diagram illustrating a radar device according to Embodiment 2 of the present invention.

FIG. 7 is a block diagram of a radar device according to Embodiment 2 of the present invention. In FIG. 7, a schematic structure of the radar device of Embodiment 2 is the same as the structure of the radar device of Embodiment 1. Here, a difference between Embodiment 2 and Embodiment 1 is mainly described. The radar device of Embodiment 2 further includes the digital filter unit 12.

In addition, the radar device of Embodiment 2 includes two frequency analyzing units 8, two target detection units 9, and two target distance and relative speed calculation units 10, each of which is the same as that in Embodiment 1. In other words, in Embodiment 2, two sets (a plurality of sets) each including the frequency analyzing unit 8, the target detection unit 9, and the target distance and relative speed calculation unit 10 are used. In the case of Embodiment 2, among functional blocks 8 to 10 of two systems, functional blocks used for a first system are denoted by numerals with suffix "A", and functional blocks used for a second system are denoted by numerals with suffix "B". The same is true for Embodiment 3 and subsequent embodiments.

The wide band filter unit 5 of Embodiment 2 suppresses unnecessary components (unnecessary signals) contained in the reception signal from the frequency conversion unit 4. In the case of Embodiment 1, the wide band filter unit 5 has frequency characteristics for performing the filtering so that the isolation between transmitting and receiving becomes a desired level or lower. In contrast, in Embodiment 2, the wide band filter unit 5 is not necessarily required to have the frequency characteristics as Embodiment 1.

The digital filter unit 12 performs a digital filter process on the digital reception signal stored in the video signal storage unit 7. In addition, the digital filter unit 12 includes a digital filter having a plurality of frequency characteristics. Note that, Embodiment 2 describes a case where the digital filter having two frequency characteristics is used.

Figure 8:
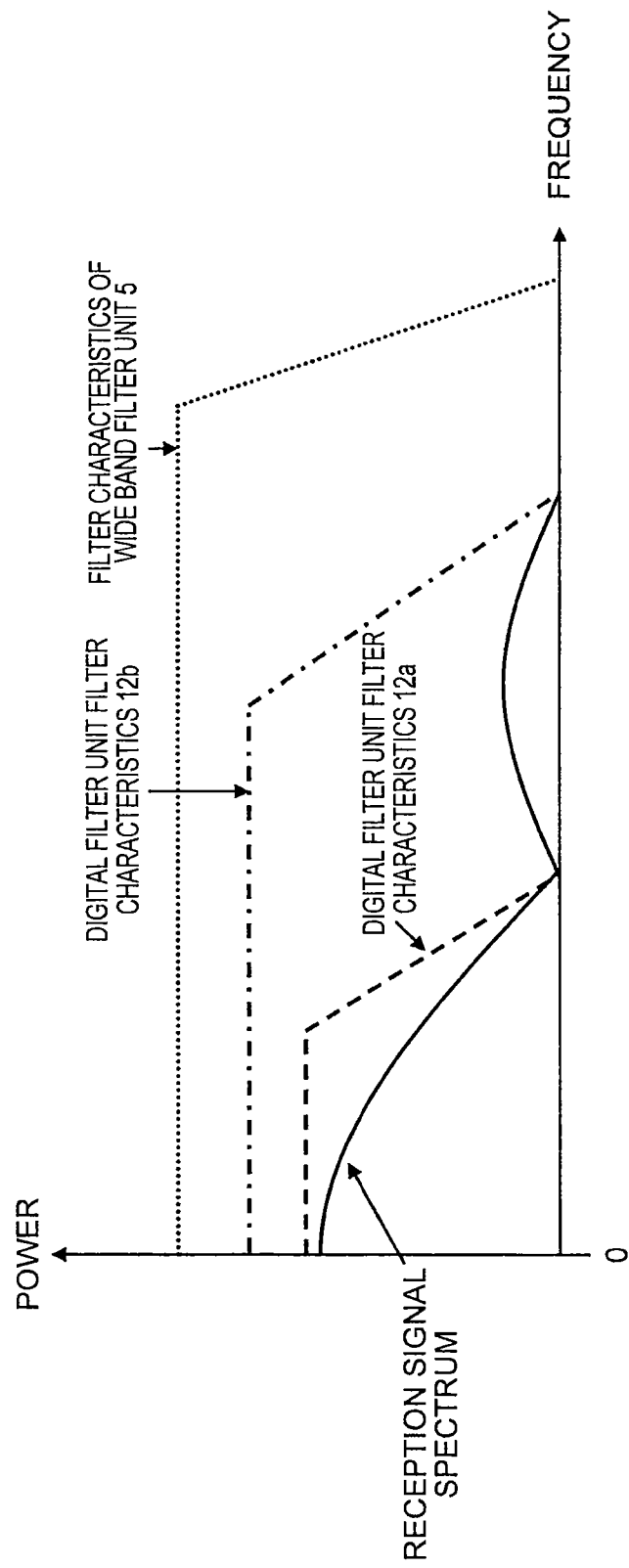
[FIG. 8] An explanatory diagram illustrating frequency characteristics of a digital filter and a reception signal of a wide band filter unit and a digital filter unit.

In addition, FIG. 8 is an explanatory diagram illustrating frequency characteristics of the digital filters and the reception signals of the wide band filter unit 5 and the digital filter unit 12. Note that, the frequency characteristics of the wide band filter unit 5 of FIG. 8 correspond to the frequency characteristics of Embodiment 1. In the following, the two frequency characteristics of the digital filter are respectively described as digital filter unit filter characteristics 12a and digital filter unit filter characteristics 12b.

The digital filter unit filter characteristics 12a are characteristics of the matched filter for performing the filtering so as to maximize the SNR of the reception signal. However, the filter is not necessarily the matched filter, and is only required to be a digital filter for performing the filtering so as to maximize the SNR or to secure a desired SNR. In addition, as described above, the matched filter has the band width similar to the signal band width, and a filter having a passing band width of 1.2 to 1.3 times the signal band width is used in many cases.

The digital filter unit filter characteristics 12b have a wider passing band width than the digital filter unit filter characteristics 12a and are frequency characteristics for performing the filtering so that the isolation between transmitting and receiving becomes a desired level or lower.

Among signals processed by the digital filter unit 12, the signal that has passed through the digital filter unit filter characteristics 12a is sent to a frequency analyzing unit 8A. In addition, among signals processed by the digital filter unit 12, the signal that has passed through the digital filter unit filter characteristics 12b is sent to a frequency analyzing unit 8B.

The frequency analyzing units 8A and 8B perform the same process as the frequency analyzing unit 8 in Embodiment 1. However, the frequency analyzing unit 8A performs the process on the signal of the long distance range gate (long distance measurement target zone). In addition, the frequency analyzing unit 8B performs the process on the signal of the short distance range gate (short distance measurement target zone). In other words, the frequency analyzing units 8A and 8B selectively receive a signal subjected to the filtering with filter characteristics of one of the digital filter unit filter characteristics 12a and 12b of the digital filter unit 12 in accordance with the range gate, and perform the frequency analysis on the received signal. The signals processed by the frequency analyzing units 8A and 8B are sent to the target detection units 9A and 9B, respectively.

The target detection units 9A and 9B detect the target signals from the signals subjected to the frequency analysis by the frequency analyzing units 8A and 8B. The pieces of frequency information of the target detected by the target detection units 9A and 9B are sent to target distance and relative speed calculation units 10A and 10B. The target distance and relative speed calculation units 10A and 10B calculate distance and relative speed of the target from the pieces of frequency information of the target from the target detection units 9A and 9B. The pieces of target distance and relative speed information calculated by the target distance and relative speed calculation units 10A and 10B are sent to the tracking process unit 11. Other structures and actions are the same as those of Embodiment 1.

According to the radar device of Embodiment 2 described above, for a signal from a short distance target, the digital filter unit filter characteristics 12b are used, which are frequency characteristics for performing the filtering so that the isolation between transmitting and receiving becomes a desired level or lower. With this structure, similarly to Embodiment 1, isolation between transmitting and receiving in the case using a radio wave is improved, and hence a signal from the short distance target can be easily detected.

Figure 9:
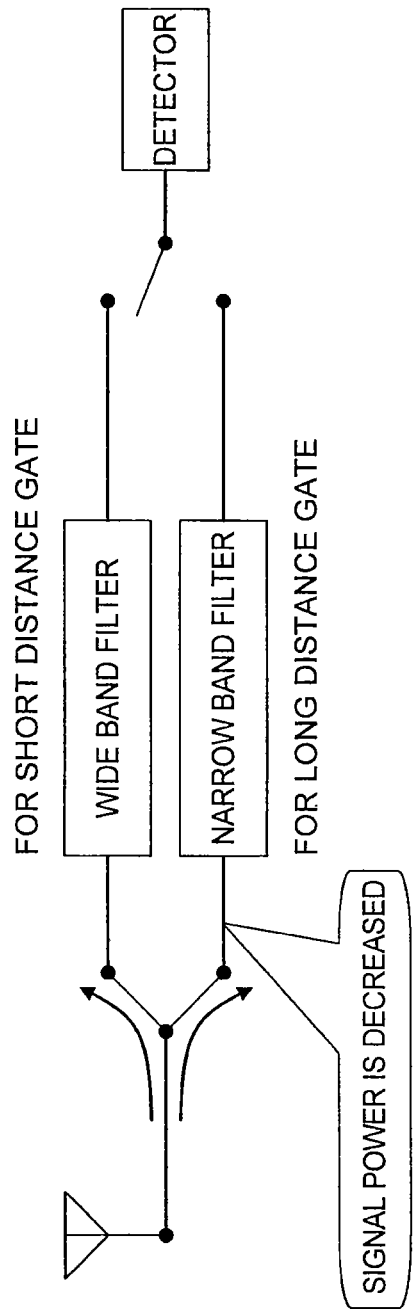
[FIG. 9] A block diagram illustrating a conventional device.

Here, the problem of the conventional technique is described. The conventional device as described in Patent Literature 1 is required to have a plurality of analog filters. For instance, as illustrated in FIG. 9, when two analog filters are used, there is a problem in that a signal power is lowered and the SNR is deteriorated because the analog reception signal is divided into two. Note that, because the radar device of Patent Literature 1 is the optical radar device, the isolation between transmitting and receiving is not a problem, and the wide band filter illustrated in FIG. 9 does not have the frequency characteristics for performing the filtering so that the isolation between transmitting and receiving becomes a desired level or lower.

Figure 10:
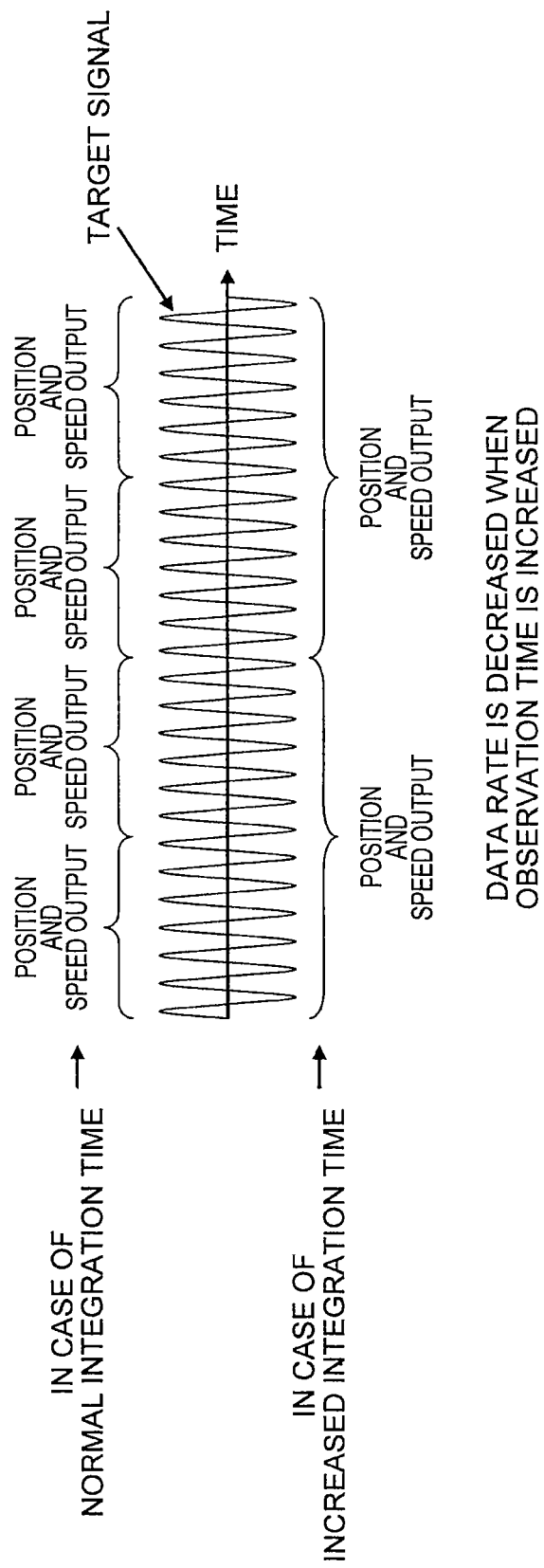
[FIG. 10] An explanatory diagram illustrating a coherent integration time.

In addition, in a general radar device, coherent integration is often used for improving the SNR, and an improving degree of SNR is proportional to coherent integration time. For instance, in order to improve the SNR by twice, it is necessary to increase the coherent integration time by twice. However, as illustrated in FIG. 10, when the coherent integration time is increased, there occurs a problem that, for example, an update rate of position and speed information of the target is decreased.

Further, the conventional device as described in Patent Literature 1 has a problem in that distance resolution of a long distance target is deteriorated, and two targets at a long distance cannot be separated.

As for these problems, because the radar device of Embodiment 2 uses the digital filter unit filter characteristics 12a that are characteristics of the matched filter for signals from long distance targets, it is possible to improve the SNR without increasing the coherent integration time, and a signal from a long distance target can be easily detected. In addition, because the distance resolution is determined by the transmission band width, the distance resolution is not deteriorated also at a long distance.

Note that, the digital filter unit 12 has the two frequency characteristics in Embodiment 2. However, without limiting to this example, the digital filter unit 12 may have three or more frequency characteristics. In addition, it is possible to use three or more sets each including the frequency analyzing unit 8, the target detection unit 9, and the target distance and relative speed calculation unit 10 corresponding to the number of the frequency characteristics of the digital filter unit 12.

Embodiment 3

Embodiment 2 describes the structure using the digital filter unit 12 having the two characteristics of the digital filter unit filter characteristics 12a and 12b. In contrast, Embodiment 3 describes a structure using the digital filter unit 12 having only the digital filter unit filter characteristics 12a.

Figure 11:
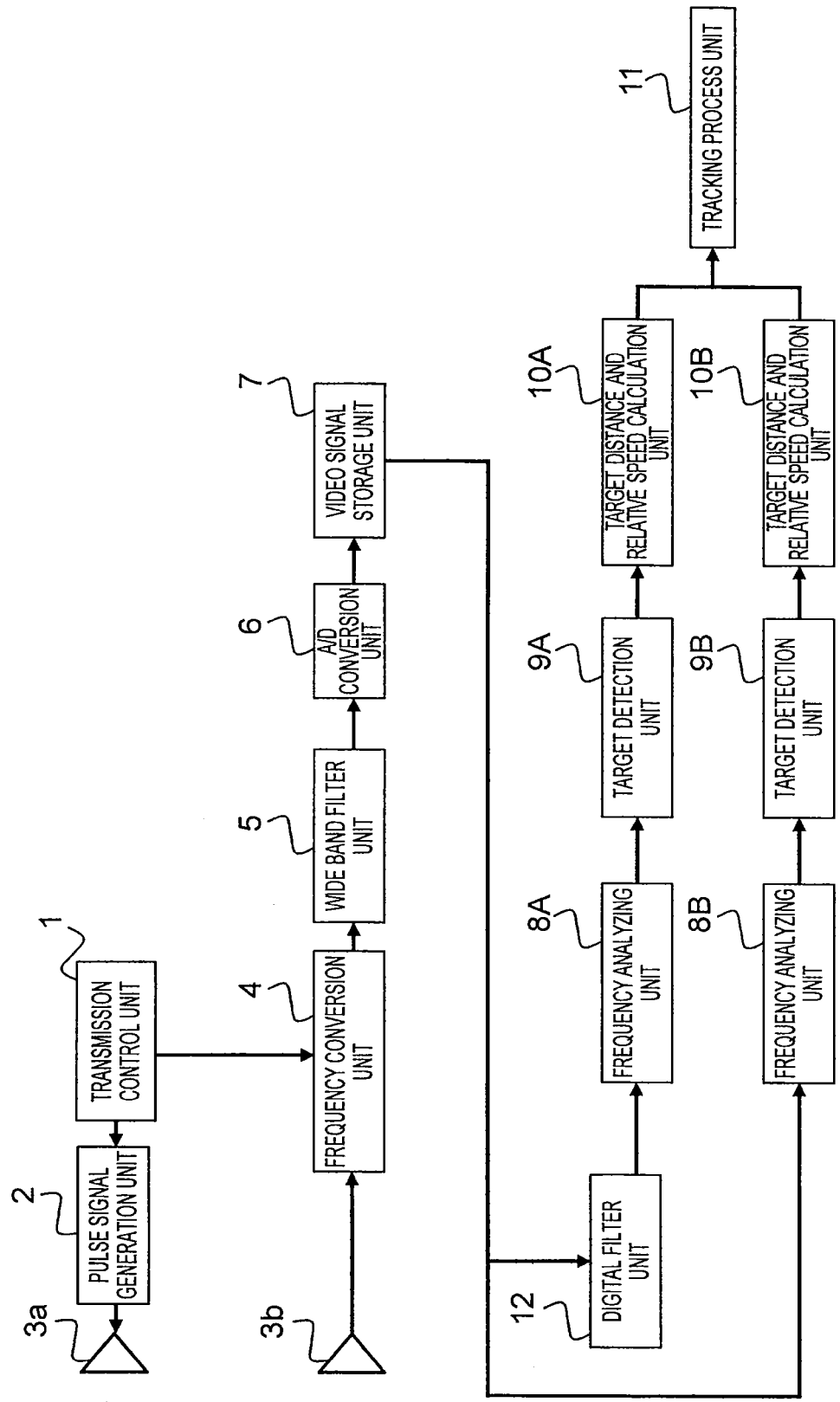
[FIG. 11] A block diagram illustrating a radar device according to Embodiment 3 of the present invention.

FIG. 11 is a block diagram of a radar device according to Embodiment 3 of the present invention. In FIG. 11, a schematic structure of the radar device of Embodiment 3 is the same as the structure of the radar device of Embodiment 2. Here, a difference between Embodiment 3 and Embodiment 2 is mainly described.

Similarly to the wide band filter unit 5 of Embodiment 1, the wide band filter unit 5 of Embodiment 3 has frequency characteristics for performing the filtering so that the isolation between transmitting and receiving becomes a desired level or lower. The video signal storage unit 7 of Embodiment 3 sends the stored digital video signal to each of the digital filter unit 12 and the frequency analyzing unit 8B.

The digital filter unit 12 of Embodiment 3 is a digital filter having the frequency characteristics of the digital filter unit filter characteristics 12a of Embodiment 2 illustrated in FIG. 8. That is, the digital filter unit 12 of Embodiment 3 is a matched filter for performing the filtering so as to maximize the SNR of the reception signal. However, the digital filter unit 12 is not necessarily the matched filter, and is only required to be a digital filter for performing the filtering so as to maximize the SNR or to secure a desired SNR.

The frequency analyzing units 8A and 8B in Embodiment 3 perform the same process as the frequency analyzing unit 8 in Embodiment 1. However, the frequency analyzing unit 8A performs the process on the signal of the long distance range gate. In addition, the frequency analyzing unit 8B performs the process on the signal of the short distance range gate. In other words, the frequency analyzing units 8A and 8B selectively receive one of a signal from an inter-range bin addition process unit 13 or a digital video signal of the video signal storage unit 7 in accordance with the range gate, and perform the frequency analysis on the received signal. The signals processed by the frequency analyzing units 8A and 8B are sent to the target detection units 9A and 9B, respectively. Other structures and actions are the same as those of Embodiments 1 and 2.

According to the radar device of Embodiment 3 described above, for a signal from a short distance target, the wide band filter unit 5 is used, which has such frequency characteristics that the isolation between transmitting and receiving becomes a desired level or lower. With this structure, similarly to Embodiment 1, isolation between transmitting and receiving in the case using a radio wave is improved, and hence a signal from the short distance target can be easily detected.

In addition, the digital filter unit filter characteristics 12*a* that are characteristics of the matched filter are used for the signal from a long distance target. With this structure, the SNR can be improved without increasing the coherent integration time, and a signal from a long distance target can be easily detected. In addition, because the distance resolution is determined by the transmission band width, the distance resolution is not deteriorated also at a long distance.

Embodiment 4

Embodiments 2 and 3 describe the structure using the digital filter unit 12. In contrast, Embodiment 4 describes a structure using the inter-range bin addition process unit (inter-range bin addition process device) 13.

Figure 12:
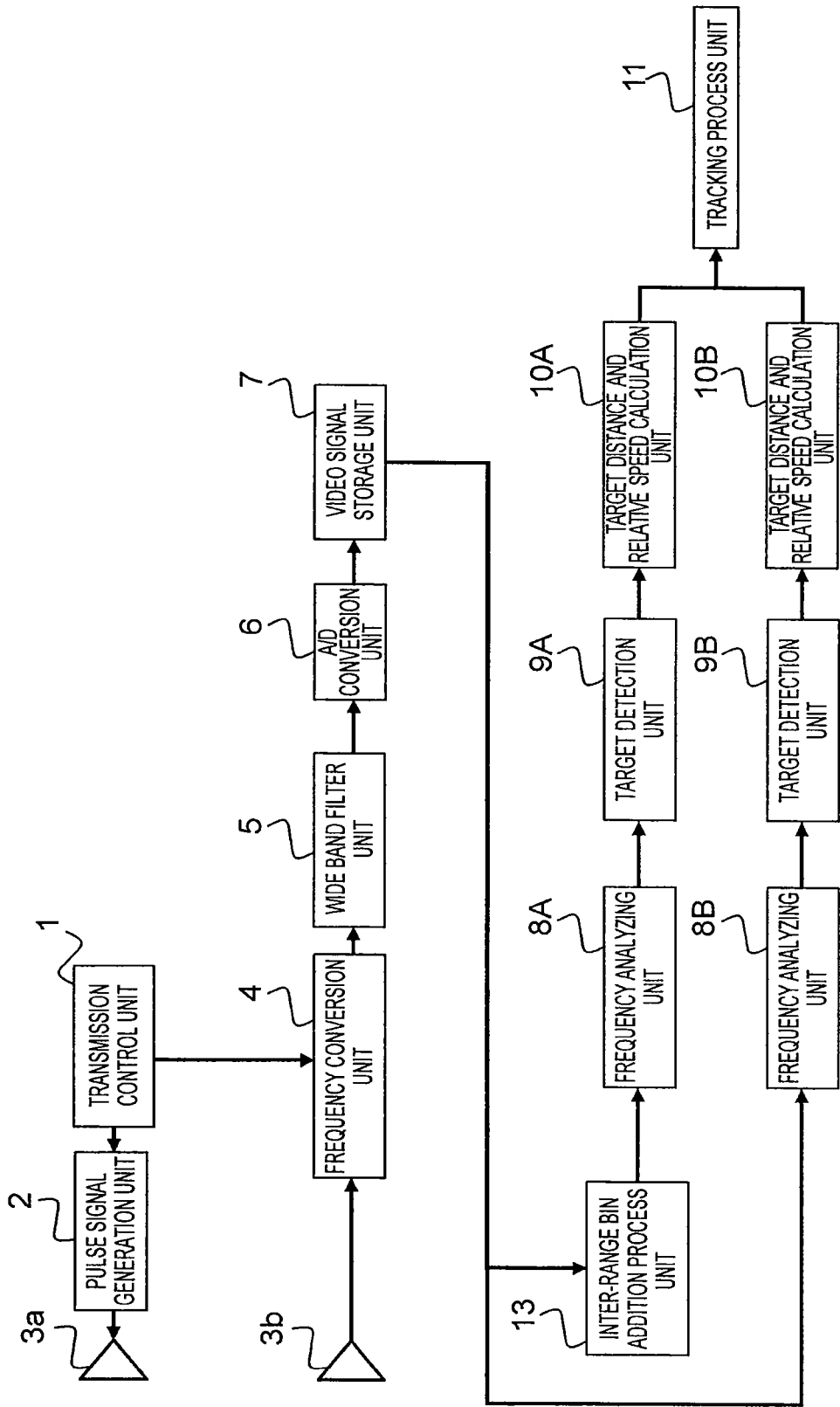
[FIG. 12] A block diagram illustrating a radar device according to Embodiment 4 of the present invention.

FIG. 12 is a block diagram illustrating a radar device according to Embodiment 4 of the present invention. In FIG. 12, a general structure of the radar device of Embodiment 4 is the same as the structure of the radar device of Embodiment 3. Here, a difference between Embodiment 4 and Embodiment 3 is mainly described. The radar device of Embodiment 4 includes the inter-range bin addition process unit 13 instead of the digital filter unit 12 of Embodiment 3.

Figure 13:
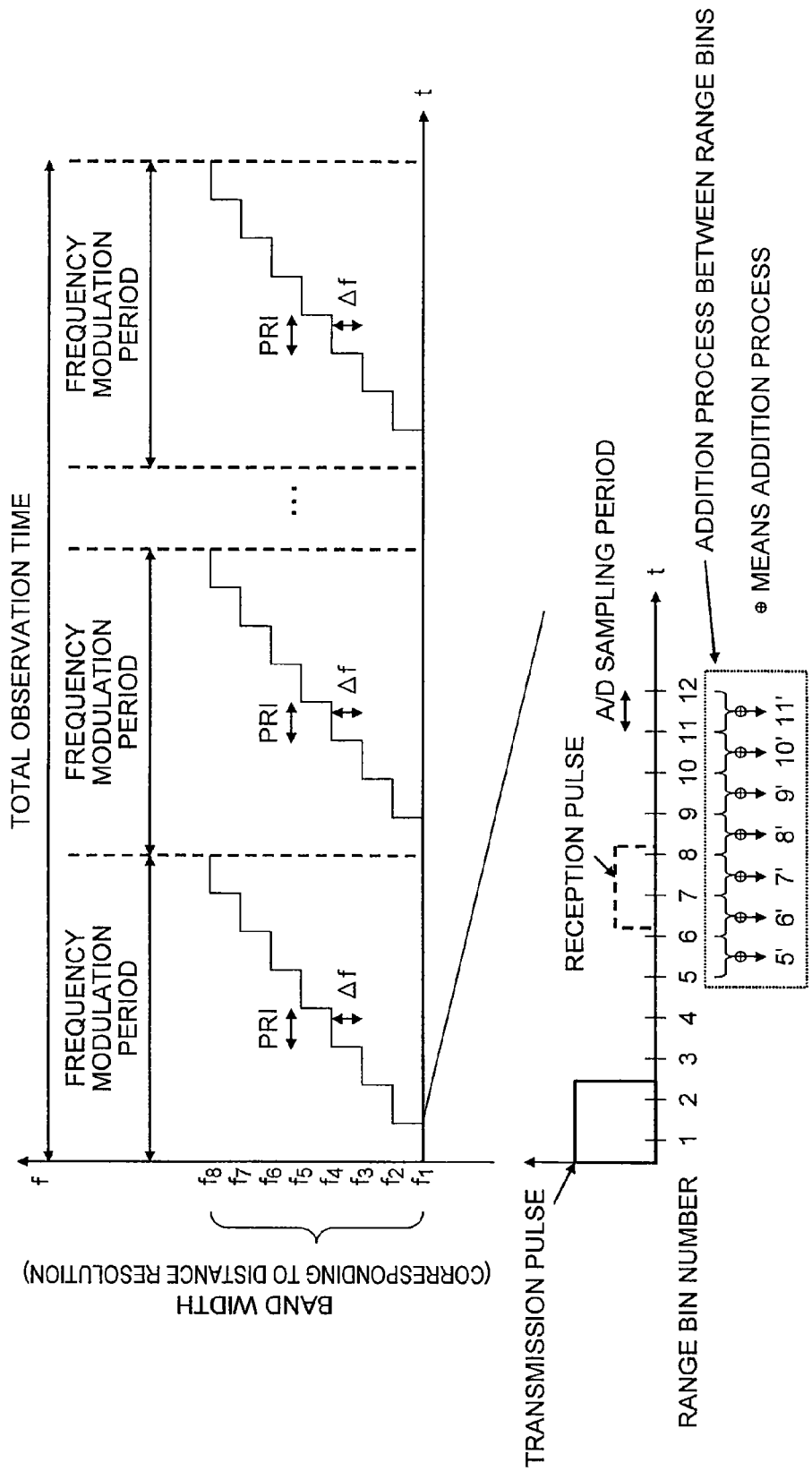
[FIG. 13] An explanatory diagram illustrating an outline of an addition process between range bins.

The inter-range bin addition process unit 13 performs a process of adding signals of adjacent range bins. FIG. 13 is an explanatory diagram illustrating an outline of the addition process between range bins. Note that, FIG. 13 illustrates an example of adding two adjacent range bins, but it is possible to add three or more adjacent range bins in accordance with a pulse width of the reception pulse. In this case, in the wide band filter unit 5, because of the frequency characteristics as the wide band filter, correlation of noise is small also between the range bins. In addition, because the reflected signal from the target can be regarded to have substantially the same phase between the range bins, the SNR can be improved.

Further, the data processed by the inter-range bin addition process unit 13 is sent to each of the frequency analyzing units 8A and 8B. Other structures and actions are the same as those of Embodiments 1 to 3.

According to the radar device of Embodiment 4 described above, for a signal from a short distance target, the wide band filter unit 5 is used, which has the frequency characteristics for performing the filtering so that the isolation between transmitting and receiving becomes a desired level or lower. With this structure, similarly to Embodiment 1, the isolation between transmitting and receiving in the case using a radio wave is improved, and hence a signal from the short distance target can be easily detected. In addition, for a signal from a long distance target, the inter-range bin addition process unit 13 is used. With this structure, the SNR can be improved without increasing the coherent integration time, and hence a signal from the long distance target can be easily detected. In addition, because the distance resolution is determined by the transmission band width, the distance resolution is not deteriorated also at a long distance.

Further, according to the radar device of Embodiment 4, the digital filter unit 12 of Embodiments 2 and 3 can be eliminated, and hence the calculation time can be decreased.

Embodiment 5

Embodiment 4 describes the structure in which the two frequency analyzing units 8A and 8B are used, and the inter-range bin addition process unit 13 is disposed between the video signal storage unit 7 and the frequency analyzing unit 8A. In contrast, Embodiment 5 describes a structure in which the single frequency analyzing unit 8 is used, and the inter-range bin addition process unit 13 is disposed between the frequency analyzing unit 8 and the target detection unit 9A.

Figure 14:
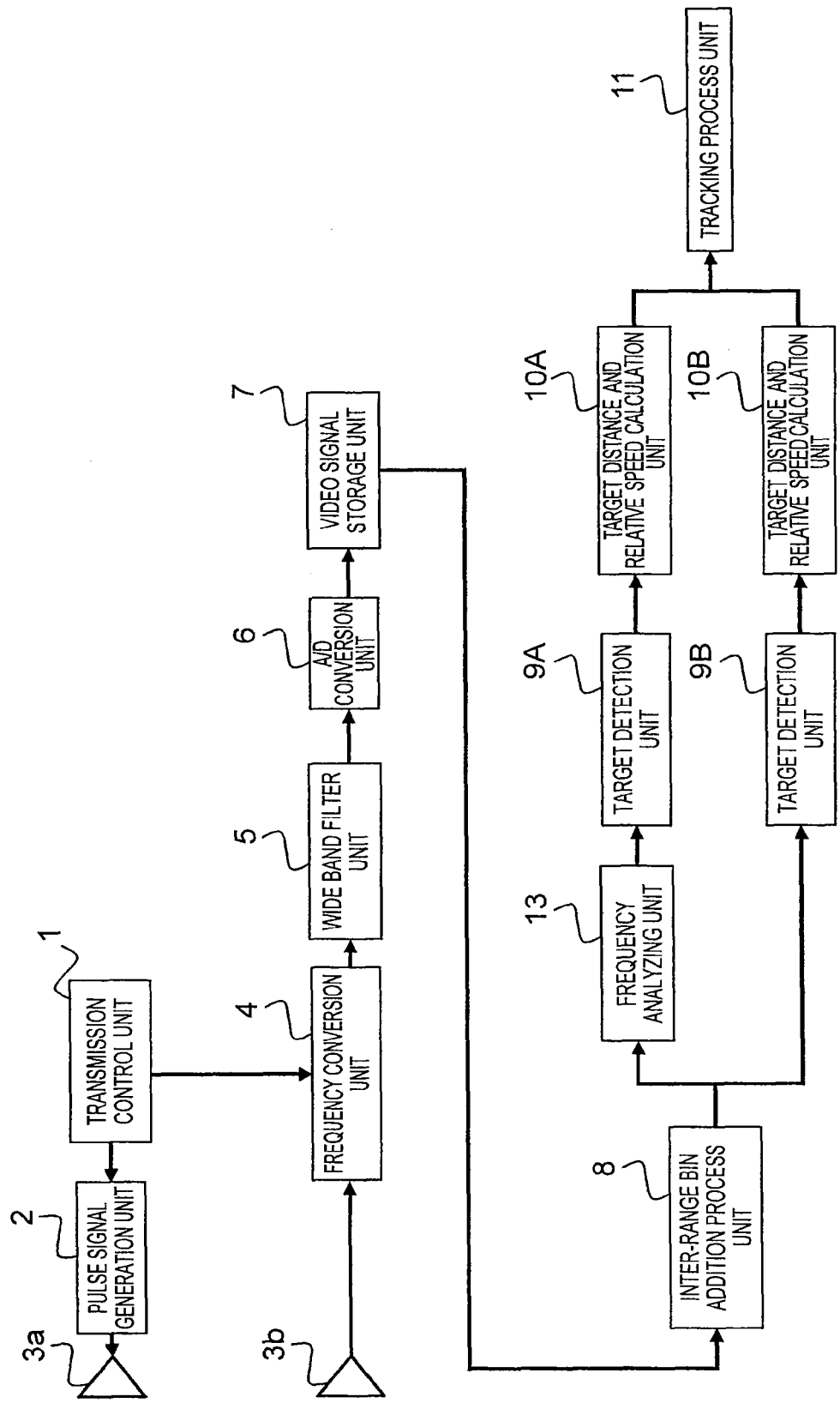
[FIG. 14] A block diagram illustrating a radar device according to Embodiment 5 of the present invention.

FIG. 14 is a block diagram of a radar device according to Embodiment 5 of the present invention. In FIG. 14, a schematic structure of the radar device of Embodiment 5 is the same as the structure of the radar device of Embodiment 4. Here, a difference between Embodiment 5 and Embodiment 4 is mainly described.

The frequency analyzing unit 8 of Embodiment 5 performs the frequency analysis on the digital reception signal stored in the video signal storage unit 7. The frequency analyzing unit 8 sends the signal subjected to the frequency analysis (subjected to the FFT) to each of the inter-range bin addition process unit 13 and the target detection unit 9B.

The inter-range bin addition process unit 13 of Embodiment 5 performs the process of adding signals of adjacent range bins similarly to Embodiment 4. In Embodiment 4, the inter-range bin addition process unit 13 performs the addition process between range bins at a stage prior to the frequency analyzing unit 8A. In contrast, in Embodiment 5, the inter-range bin addition process unit 13 performs the addition process between range bins at a stage after the frequency analyzing unit 8. Other structures and actions are the same as those of Embodiments 1 to 4.

According to the radar device of Embodiment 5 described above, the same effect as Embodiment 4 can be obtained even by the structure in which the addition process between range bins is performed by the inter-range bin addition process unit 13 at a stage after the frequency analyzing unit 8. In addition, as compared with Embodiment 4, the number of the frequency analyzing units 8 can be reduced, and hence the structure can be simplified.

Note that, Embodiments 1 to 5 describe the examples in which the multi-frequency step ICW method is used as the predetermined radar method. However, other than the multi-frequency step ICW method, it is possible to use a pulse Doppler method, an FM pulse method, or a combined band process method as the predetermined radar method.

The invention claimed is:
1. A radar device, comprising:
 a transmission control unit that generates a reference signal corresponding to a predetermined radar method;
 a pulse signal generation unit that modulates the reference signal input from the transmission control unit into a pulse signal;
 a first antenna that radiates the pulse signal from the pulse signal generation unit into air;
 a second antenna that receives a direct wave from the first antenna and a reflected signal from a target;
 a frequency conversion unit that uses the reference signal from the transmission control unit so as to convert a frequency of a reception signal received by the second antenna;
 a wide band filter unit having a band pass frequency response with a wider band width than a frequency band of the pulse signal, the wide band filter unit performing filtering without rounding a pulse waveform of the pulse signal so that isolation between transmitting and receiving is at least a predetermined level, the wide band filter unit suppressing frequency components outside the frequency band of the pulse signal in a signal from the frequency conversion unit to generate an output signal;

an A/D conversion unit that converts the output signal from the wide band filter unit into a digital signal;

a storage unit that stores the digital signal from the A/D conversion unit;

a frequency analyzing unit that performs frequency analysis on the digital signal stored in the storage unit;

a target detection unit that detects, from the signal processed by the frequency analyzing unit, the reflected signal from the target as a target signal; and a target distance and relative speed calculation unit that calculates, from the target signal detected by the target detection unit, a distance and a relative speed of the target.

2. A radar device according to claim 1, further comprising a digital filter unit having frequency characteristics for performing filtering so that a signal-to-noise ratio is maximized for the digital signal stored in the storage unit, wherein:

two sets each including the frequency analyzing unit, the target detection unit, and the target distance and relative speed calculation unit are disposed in parallel to each other at a stage after the digital filter unit and a stage after the storage unit, respectively; and the frequency analyzing unit of each set selectively receives one of a signal from the digital filter unit and the signal stored in the storage unit in accordance with a range gate for signal processing, and performs the frequency analysis on the received signal.

3. A radar device according to claim 1, further comprising an inter-range bin addition process unit that adds data of adjacent range bins contained in the digital signal stored in the storage unit, in accordance with a pulse width of a reception pulse, wherein:

two sets each including the frequency analyzing unit, the target detection unit, and the target distance and relative speed calculation unit are disposed in parallel to each other at a stage after the inter-range bin addition process unit and a stage after the storage unit, respectively; and the frequency analyzing unit of each set selectively receives one of a signal from the inter-range bin addition process unit and the signal stored in the storage unit in accordance with a range gate for signal processing, and performs the frequency analysis on the received signal.

4. A radar device according to claim 1, further comprising an inter-range bin addition process unit that is disposed at a stage after the frequency analyzing unit and adds data of adjacent range bins contained in the signal processed by the frequency analyzing unit in accordance with a pulse width of a reception pulse, wherein:

two sets each including the target detection unit and the target distance and relative speed calculation unit are disposed in parallel to each other at a stage after the inter-range bin addition process unit and the stage after the frequency analyzing unit, respectively; and the target detection unit of each set selectively receives one of a signal from the inter-range bin addition process unit and the signal from the frequency analyzing unit in accordance with a range gate for signal processing, and detects, from the received signal, the reflected signal from the target as the target signal.

5. A radar device according to claim 1, wherein the predetermined radar method comprises one of a multi-frequency step ICW method, a pulse Doppler method, an FM pulse method, and a combined band process method.

6. A radar device, comprising:

a transmission control unit that generates a reference signal corresponding to a predetermined radar method;

a pulse signal generation unit that modulates the reference signal input from the transmission control unit into a pulse signal;

a first antenna that radiates the pulse signal from the pulse signal generation unit into air;

a second antenna that receives a direct wave from the first antenna and a reflected signal from a target;

a frequency conversion unit that uses the reference signal from the transmission control unit so as to convert a frequency of a reception signal received by the second antenna;

a wide band filter unit that suppresses predetermined frequency components in a signal from the frequency conversion unit so as to extract an output signal;

an A/D conversion unit that converts the output signal from the wide band filter unit into a digital signal;

a storage unit that stores the digital signal from the A/D conversion unit;

a digital filter unit that has a plurality of frequency characteristics and performs filtering on the digital signal stored in the storage unit;

a frequency analyzing unit that performs frequency analysis on a signal from the digital filter unit;

a target detection unit that detects the reflected signal from the target as a target signal from the signal processed by the frequency analyzing unit; and a target distance and relative speed calculation unit that calculates, from the target signal detected by the target detection unit, a distance and a relative speed of the target, wherein:

the plurality of frequency characteristics of the digital filter unit comprise at least one frequency characteristics for performing the filtering on the digital signal stored in the storage unit so that a signal-to-noise ratio is maximized; and the plurality of frequency characteristics of the digital filter unit comprise at least one band pass frequency characteristics having a wider band width than the frequency characteristics for performing the filtering so that the signal-to-noise ratio is maximized in order to perform the filtering without rounding a pulse waveform so that isolation between transmitting and receiving becomes at least a predetermined level on the digital signal stored in the storage unit.

7. A radar device according to claim 6, wherein:

a plurality of sets each including the frequency analyzing unit, the target detection unit, and the target distance and relative speed calculation unit are disposed in parallel to each other at a stage after the digital filter unit; and the frequency analyzing unit of each set selectively receives one of signals subjected to the filtering by the plurality of frequency characteristics of the digital filter unit in accordance with a range gate for signal processing, and performs the frequency analysis on the received signal.

8. A radar device according to claim 7, wherein the predetermined radar method comprises one of a multi-frequency step ICW method, a pulse Doppler method, an FM pulse method, and a combined band process method.

* * * * *